Patented May 20, 1924.

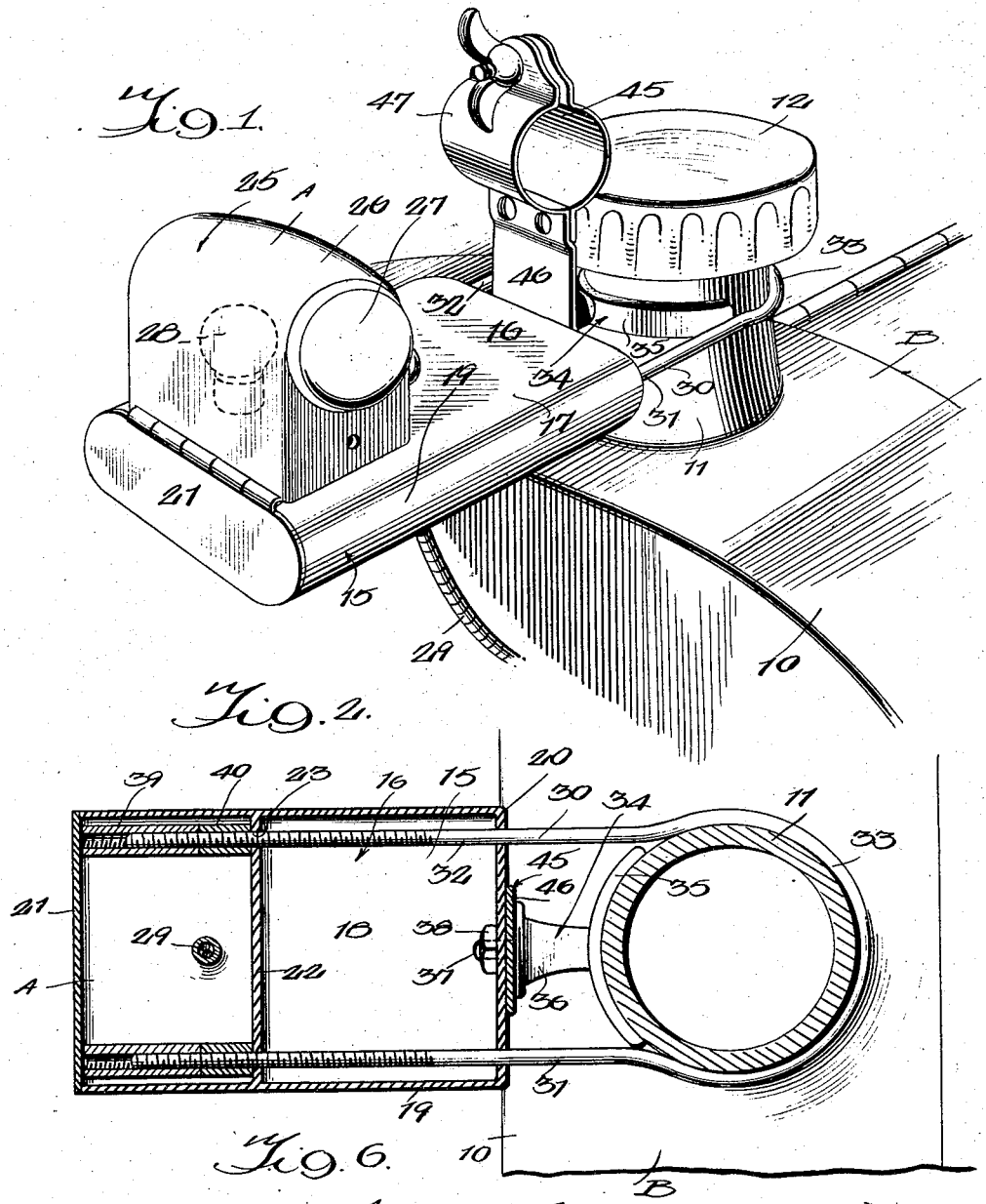

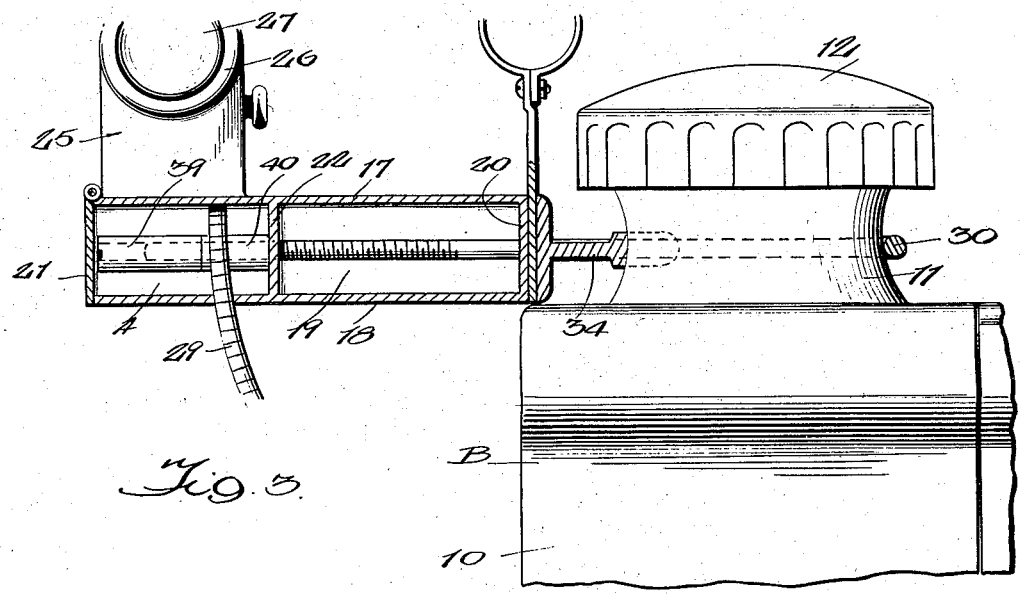
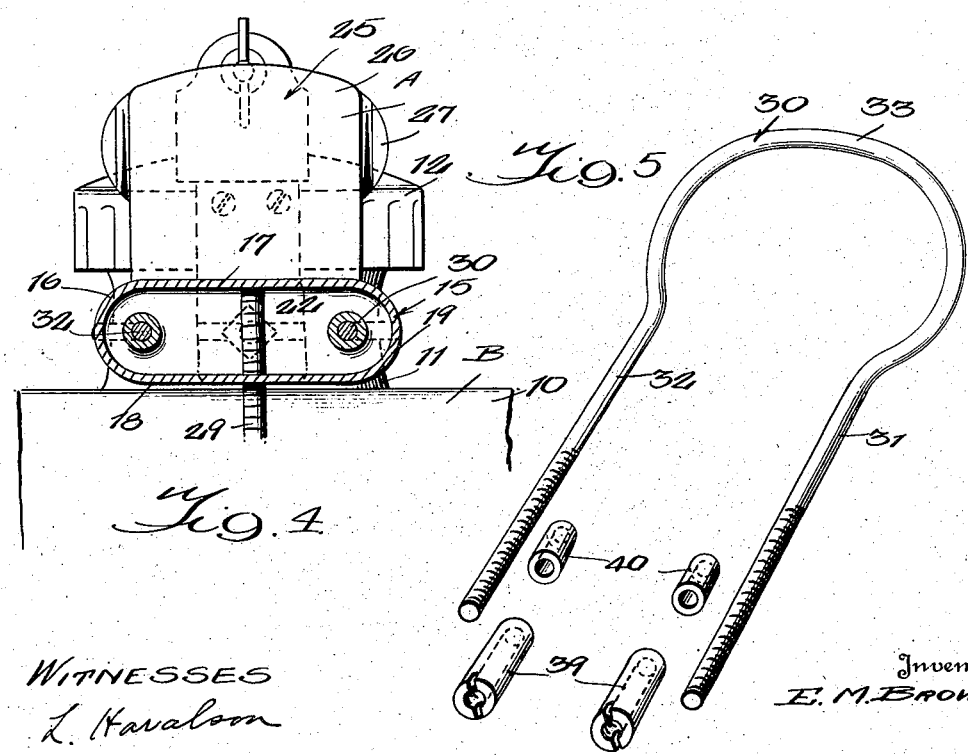

1,494,731

UNITED STATES PATENT OFFICE.

ELLIS M. BROWN, OF ROANOKE, VIRGINIA.

AUTOMOBILE ATTACHMENT.

Application filed November 28, 1923. Serial No. 677,516.

*To all whom it may concern:*

Be it known that I, ELLIS M. BROWN, a citizen of the United States, residing at Roanoke, in the county of Roanoke and State of Virginia, have invented certain new and useful Improvements in an Automobile Attachment, of which the following is a specification.

This invention appertains to a novel attachment for motor vehicles and the primary object of the invention is to provide an improved device for connection with the radiator of a motor vehicle, the device supporting a suitable illuminating lamp.

Another object of the invention is to provide a radiator attachment for motor vehicles of the ornamental type which can be effectively used as a parking light, when the occasion warrants such use thereof.

Another prime object of the invention is to provide an improved parking light attachment for the front part of a motor vehicle embodying a holder for the parking light, and novel means for connecting the holder with the filling nipple of the radiator, said novel holding means reducing the loss of the device to a minimum.

A further object of the invention is to provide novel means for supporting a flag or the like on said device when so desired.

A still further object of the invention is to provide an improved automobile attachment of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a perspective view of the improved attachment showing the same connected to a radiator of a motor vehicle.

Figure 2 is a horizontal longitudinal section through the improved attachment showing the same connected to the filling nipple of a radiator.

Figure 3 is a vertical longitudinal section through the improved attachment showing the same connected to the filling nipple of an automobile radiator.

Figure 4 is a vertical transverse section through the improved device showing parts thereof in elevation and illustrating the improved device connected with the radiator of an automobile.

Figure 5 is a detail perspective view of the novel means utilized for connecting the improved attachment with a radiator, and Figure 6 is a fragmentary detail view illustrating a modified form of the attachment, the flag or ornament holder being omitted.

Referring to the drawings in detail, wherein similar reference characters designate corresponding parts throughout the several views, the letter A generally indicates the improved automobile attachment and B a motor vehicle with which the same can be associated.

The automobile B can be of any preferred type or make and as shown the same includes the radiator 10 provided with the usual filling nipple 11 and closure cap or plug 12 therefor.

The improved attachment A is adapted to be connected with the nipple 11, so that the same will be held in place on the automobile when the cap 12 is removed, thus it is to be understood that the same can be made with the cap 12 if so desired.

The improved attachment A is so constructed as to permit the same to be effectively used as a parking light for the front machine and especially useful for this purpose when the machine is parked at an angle to the curb with the rear end of the machine against the curb.

As clearly shown in the drawings the improved attachment A comprises a base 15 preferably formed in the nature of a hollow casing. This base or casing 15 can be formed of sheet metal and suitable nickel or the like to present a neat and attractive appearance. The base 15 includes a hollow body 16 having the top and bottom walls 17 and 18, the side longitudinally extending walls 19, the inner wall 20, and a pivoted front wall 21. The body 16 can be provided with a partition plate 22 for a purpose, which will be hereinafter more fully described and by referring to Figure 2 of the drawings, it can be seen that this partition plate 22 is provided with suitable openings 23. The top wall 17 of the body 16 supports the parking light 25, which can be of any preferred construction. While I have called the element 25 a parking light, as this is the main purpose of this element, it is to be understood that the same can be used for other purposes and if so desired the whole device can be used simply as an ornament for the machine.

The parking light 25 includes a hollow casing 26 extending transversely of the base 15 adjacent to the forward end thereof and the end walls of the hollow body 26 of the parking light 25 carry suitable lenses 27 through which the rays of light from the electric lamp 28 disposed in the body 26 can travel. Any preferred type of switch for controlling the lighting of the electric lamp 28 can be employed. The electric lamp 28 can be supplied from any suitable source and as shown feed wires 29 extend into the body 26 through the base 15 and these wires can extend from the storage battery of the automobile if so desired.

An improved means 40 is provided for connecting the attachment A to the nipple 11 of the radiator 10 and as shown this means includes a U-shaped clamping member 31 embodying parallel legs 32 and arcuate connecting body portion 33 for encircling the neck 11. These legs 32 are adapted to extend longitudinally through the body 15 and are disposed in the openings 23 in the partition plate 22. A rigid clamping member 34 is provided for gripping the forward portion of the neck 11 and includes an arcuate clamping plate 35 and a connecting body 36, which is connected to the rear wall 20 of the body 15 of the base 16 by means of a suitable stem 37 and nut 38. The outer terminals of the legs 32 of the clamping member 31 are threaded for the reception of jam nuts 39, which can be rotated in any preferred way. Suitable spacing sleeves 40 can be placed upon the legs 32 between the nut 39 and the partition plate 22. It can be seen that the cover plate 21 of the base 15 normally hides these nuts 39 from view, thus reducing the stealing of the car to a minimum.

In Figures 1 to 5 inclusive I have shown the improved attachment A provided with a holder or clamp 45 for permitting the attaching of a suitable flag or ornament to the attachment, and this clamp holder can be of any preferred type or character. As shown the holder includes an upstanding attaching plate 46, which is clamped in position between the rear walls 20 of the body 16 of the base 15 and the body 36 of the rigid clamping member 34. This standard 46 supports a split clamping ring 47.

This flag or ornament holder 45 can be omitted if so desired and in Figure 6 of the drawings I have shown the appliance without the said holder.

From the foregoing description, it can be seen that I have provided a novel appliance for automobiles, which will effectively serve as a parking light for the front end of an automobile.

Changes in details may be made without departing from the spirit or the scope of this invention.

What I claim as new is:

1. The combination with an automobile including a radiator having a filling nipple, of an attachment for the automobile comprising a horizontally disposed hollow body, a lamp carried by the upper surface of the body, a rigid clamp member carried by the inner end of the body for engaging the front portion of the nipple, a movable clamping member including a pair of spaced parallel legs and a curved connecting portion for engaging the rear portion of the nipple, and means for connecting the legs of the movable clamping member with the body.

2. The combination with an automobile including radiators having a filling nipple, of an attachment for the automobile comprising a horizontally disposed hollow body including a top and bottom wall, side walls, a rigid end wall, and a pivoted front wall, a transversely extending partition plate disposed in the body, a parking lamp carried by the upper surface of the body, a rigid clamping member carried by the rear wall of the body for engaging the forward face of the nipple, a movable clamping member including a pair of parallel legs extending longitudinally through the body and through the partition plate and a connecting curved body portion for extending about the rear surface of the nipple, and nuts threaded upon said legs for engaging said partition plate, the pivoted front wall normally hiding said nuts from view.

In testimony whereof I affix my signature in presence of two witnesses.

ELLIS M. BROWN.

Witnesses:
FRANK J. SHERERTZ,
REVA WEEKS.